(12) United States Patent
Yanagisawa et al.

(10) Patent No.: US 7,151,736 B2
(45) Date of Patent: Dec. 19, 2006

(54) OBJECTIVE LENS AND OPTICAL PICKUP DEVICE

(75) Inventors: Takuma Yanagisawa, Saitama (JP); Makoto Sato, Saitama (JP)

(73) Assignee: Pioneer Corporation, Tokyo (JP)

( * ) Notice: Subject to any disclaimer, the term of this patent is extended or adjusted under 35 U.S.C. 154(b) by 516 days.

(21) Appl. No.: 10/655,349

(22) Filed: Sep. 5, 2003

(65) Prior Publication Data

US 2004/0047268 A1    Mar. 11, 2004

(30) Foreign Application Priority Data

Sep. 10, 2002  (JP) ............................ P2002-263532

(51) Int. Cl.
*G11B 7/00*   (2006.01)
(52) U.S. Cl. ................ 369/112.23; 369/44.12
(58) Field of Classification Search ............. 369/112.1, 369/112.01, 112.02, 112.23, 44.23, 44.24, 369/44.12

See application file for complete search history.

(56) References Cited

U.S. PATENT DOCUMENTS 5,513,158 A *  4/1996  Ohsato ................... 369/44.23
6,940,798 B1 * 9/2005  Noborimoto et al. .... 369/53.22

FOREIGN PATENT DOCUMENTS

| DE | 32 10629 A1 | 10/1982 |
| JP | 10-020263 A | 1/1998 |
| JP | 2002-150598 A | 5/2002 |
| WO | WO 01/24174 A1 | 5/2001 |

* cited by examiner

*Primary Examiner*—Nabil Hindi
(74) *Attorney, Agent, or Firm*—Sughrue Mion, PLLC

(57) ABSTRACT

An objective lens for converging light onto an information recording medium includes a refracting interface for converging an incident light into a convergent light, and a refractive index varying member disposed between the refracting interface and the information recording medium, and having a refractive index that is varied according to an externally applied voltage.

14 Claims, 4 Drawing Sheets

OBJECTIVE LENS AND OPTICAL PICKUP DEVICE

CROSS REFERENCE OF RELATED APPLICATION

This application is based on and claims priority under 35 U.S.C. §119 with respect to Japanese Patent Application No. 2002-263532 filed on Sep. 10, 2002, the entire content of which is incorporated herein by reference.

BACKGROUND OF THE INVENTION

1. Field of the Invention

The present invention relates to an objective lens and an optical pickup device.

2. Description of the Related Art

Generally, the optical disks such as CD and DVD for reading and writing data using the laser beam have widely spread. An optical disk records the digital bit information by forming a microscopic hole called a pit in a disk-like base substance. A metallic reflection layer and a transparent protective layer having a transmittance are laminated as coating on the pits.

To read information from the optical disk, an optical pickup device is employed. In the optical pickup device, a laser beam emitted from a laser light source is converged via an objective lens onto the optical disk, and a reflected light from the optical disk is received and converted into an electrical signal to read the information written in the pits.

Generally, the recording density of the optical disk is directly proportional to the numerical aperture NA of the objective lens, and inversely proportional to the recording/reproducing wavelength $\lambda$ of laser beam, as represented by the following formula (1).

$$\text{(Recording density)} \propto (NA/\lambda)^2 \qquad (1)$$

In the case of an optical disk system, if the thickness of a light transmitting layer in the disk to be supposed in designing the objective lens is different from the thickness of the light transmitting layer in the disk to be actually reproduced, a spherical aberration occurs. This spherical aberration is directly proportional to the numerical aperture NA of the objective lens to the sixth power, and inversely proportional to the recording/reproducing wavelength $\lambda$ as represented by the following formula (2).

$$\text{(Spherical aberration due to disk thickness error)} \propto (NA^6/\lambda)\Delta T \qquad (2)$$

where $\Delta T$ is the thickness error of light transmitting layer

In order to increase the recording density, the numerical aperture NA may be increased or the recording/reproducing wavelength $\lambda$ shortened in accordance with the formula (1). However, if the numerical aperture NA is increased or the wavelength $\lambda$ is shortened, there is the possibility that the thickness error of the light transmitting layer in the optical disk or the spherical aberration in recording or reproducing the multi-layer disk is greatly increased. Thereby, there is a need for providing some spherical aberration correcting means to record or reproduce the disk stably in such cases.

In the optical disk system, a technique for correcting the spherical aberration using the spherical aberration correcting means has been disclosed in JP-A-2002-150598 (pages 5 to 8, FIGS. 1 to 13) and JP-A-10-20263 (page 6, FIGS. 1 to 4).

In JP-A-2002-150598, there is disclosed an expander lens for correcting the spherical aberration by transmitting the parallel light before incident upon the objective lens. According to JP-A-2002-150598, the expander lens is structured by two lenses and corrects the spherical aberration by adjusting the distance between both the lenses.

In JP-A-10-20263, there are disclosed a liquid crystal panel for correcting the spherical aberration by transmitting the parallel light before incident upon the objective lens, and a liquid crystal panel control circuit for controlling this liquid crystal panel. According to JP-A-10-20263, the liquid crystal panel is formed with an electrode pattern composed of a plurality of electrodes in a predetermined configuration. The liquid crystal panel control circuit controls the application of the voltage to each of the plurality of electrodes to correct an optical path difference and reduce the aberration.

However, since the expander lens is larger in size and heavier in weight than the optics of the objective lens, there is a problem that it is difficult to reduce the size of the pickup employing the expander lens. Also, since it is required to change the lens-to-lens distance mechanically by moving two lenses composing the expander lens, there is a problem that the response speed is slower.

Also, in the case where the parallel light before incident upon the objective lens is corrected for an optical path difference, employing the liquid crystal panel, it is necessary to form an electrode pattern having a complex shape on the liquid crystal panel to treat the aberration that occurs in correspondence with the shape of the objective lens. Accordingly, the manufacturing cost is increased to be less practical.

Also, in the case where a special liquid crystal panel of orbicular zonal shape is employed, if the center of the liquid crystal panel is deviated off the center of the objective lens, the spherical aberration correction effect is degraded. Accordingly, it is necessary to align correctly the center of the liquid crystal panel with the center of the objective lens, requiring more manufacturing operation.

Moreover, in the case where the liquid crystal panel is employed, it is required to make a complex wiring for each electrode because the voltages are applied to the plurality of electrodes individually. Accordingly, the number of copper wires for connection is increased, the number of parts is increased, and further the manufacturing efficiency is aggravated.

SUMMARY OF THE INVENTION

The present invention solves a problem that arises when the expander lens is employed and a problem that arises when the liquid crystal panel having the complex electrode pattern is employed.

To achieve the above object, according to one aspect of the invention, there is provided an objective lens for converging light onto an information recording medium, comprising a refracting interface for converging an incident light into a convergent light, and a refractive index varying member disposed between the refracting interface and the information recording medium, and having a refractive index that is varied according to an externally applied voltage.

According to another object of the invention, there is provided an optical pickup device comprising a light source for emitting a laser beam, an objective lens for converging the laser beam onto an information recording medium, and a light receiving portion for receiving the laser beam reflected from the information recording medium, wherein the objective lens includes a refracting interface for converging the laser beam into a convergent light, and a refractive index varying member disposed between the refracting interface and the information recording medium, and having a refractive index that is varied according to an externally applied voltage.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

The preferred embodiments of the present invention will be described below in detail with reference to the accompanying drawings.

First Embodiment

An optical pickup device according to a first embodiment of the present invention will be described below.

Figure 1:
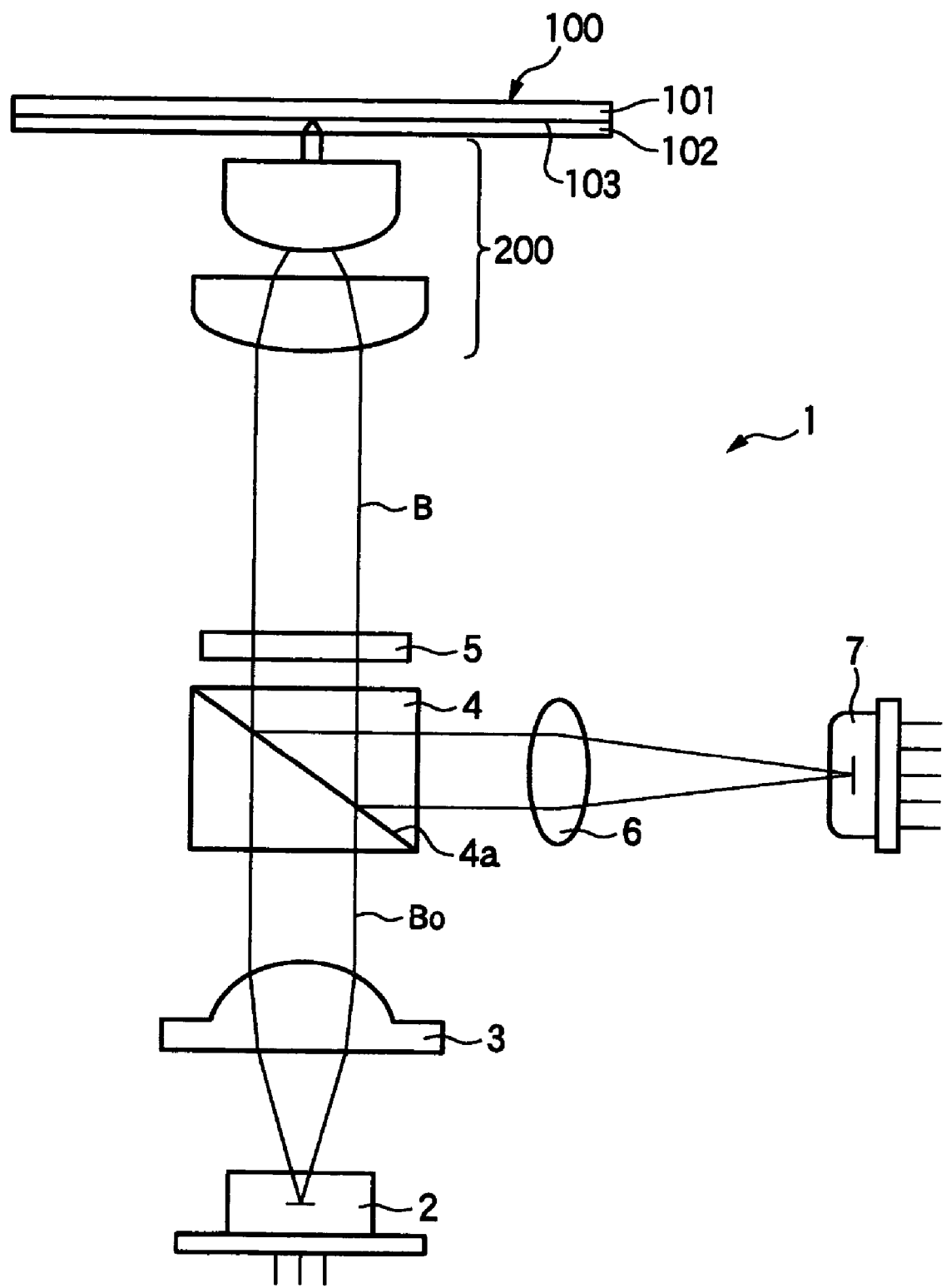
FIG. 1 is a view showing an optical pickup device according to a first embodiment of the present invention.

FIG. 1 is a view showing an optical arrangement of an optical pickup device 1 according to the first embodiment of the invention. The optical pickup device 1 reads the information recorded on a signal recording face 103 of an optical disk 100 such as CD or DVD by applying a laser beam onto the optical disk 100 and receiving a reflected light. The optical pickup device 1 includes a laser light source 2, a collimator lens 3, a polarized beam splitter 4, a quarter wavelength plate 5, an objective lens 200, a focus lens 6 and a light receiving portion 7.

The laser light source 2 is a semiconductor laser light source for emitting a laser beam $B_0$ of a predetermined wavelength with a plane of polarization P. The laser beam for reading the signal on the disk 100 is different in the wavelength between DVD and CD. The laser beam having a wavelength of 650 nm for DVD or a wavelength of 780 nm for CD is employed. Also, the blue-violet laser beam having a wavelength of 405 nm is employed in the Blu-ray Disc standards with the laser beam having shorter wavelengths. The laser beam B0 emitted from the laser light source 2 is passed to the collimator lens 3.

The collimator lens 3 converts the laser beam B0 emitted from the laser light source 2 into parallel light. Herein, the parallel light means the light in which all the optical paths of laser beams emitted from the laser light source 2 are almost parallel to the optical axis. The parallel light emitted from the collimator lens 3 is passed to the polarized beam splitter 4.

The polarized beam splitter 4 is an element for transmitting the laser beam $B_0$ as the laser beam B that is a linearly polarized light having the plane of polarization P, and reflecting the laser beam reflected on the optical disk 100 and coming from the side of the optical disk 100, with the plane of polarization P being rotated by 90°. The laser beam directly passing through the polarized beam splitter 4 goes to the quarter wavelength plate 5. Also, the laser beam B incident from the side of the optical disk 100 and reflected from the polarized beam splitter 4 is bent by 90° in the propagating direction and directed to the focus lens 6.

The quarter wavelength plate 5 is an element for converting linearly polarized light into circularly polarized light, or circularly polarized light into linearly polarized light by rotating the electric field components of incident laser beam. The laser beam B that is linearly polarized light from the polarized beam splitter 4 incident upon the quarter wavelength plate 5 is converted into circularly polarized light by the quarter wavelength plate 5, and passed to the objective lens 200. Also, the laser beam B that is circularly polarized light reflected on the optical disk 100 and again incident upon the quarter wavelength plate 5 is converted into linearly polarized light by the quarter wavelength plate and incident upon the polarized beam splitter 4 again. The laser beam having passed through the quarter wavelength plate 5 twice has the plane of polarization rotated by 90°.

The objective lens 200 converges the laser beam B passed from the quarter wavelength plate 5 onto the signal recording face 103 formed inside the optical disk 100. Also, the objective lens 200 converges the laser beam B reflected on the optical disk into parallel light to be passed to the quarter wavelength plate 5. The optical disk 100 has a substrate 102, in which the signal recording face 103 is formed on one side or both sides of the substrate 102. The signal recording face 103 is covered with the transparent protective layer 102 having light transmittance for protecting the signal recording face 103.

The focus lens 6 is disposed between the polarized beam splitter 4 and the light receiving portion 7. The focus lens 6 converges the laser beam B emergent from the polarized beam splitter 4 onto the light receiving portion 7. The light receiving portion 7 receives the laser beam B, and converts it into an electrical signal to read the information.

Figure 2:
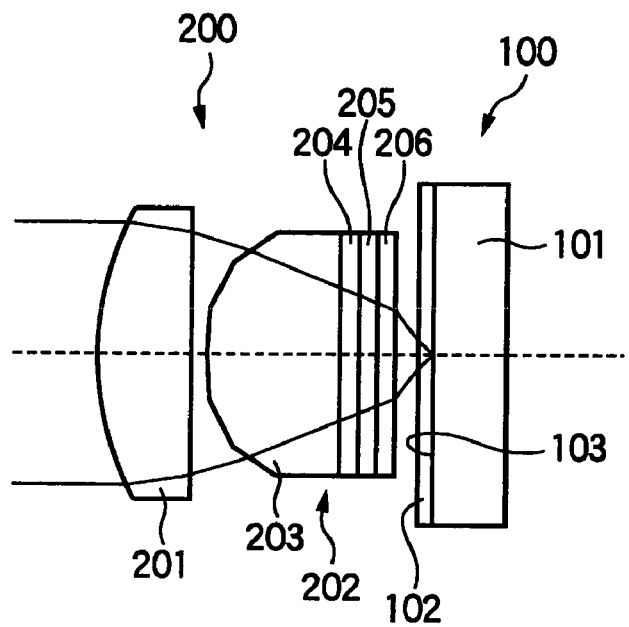
FIG. 2 is a view showing an objective lens according to the first embodiment.

FIG. 2 is a cross-sectional view showing the details of the objective lens 200. The objective lens 200 has a first objective lens 201 disposed on the side of the quarter wavelength plate 5 and a second objective lens 202 disposed opposite the disk 100 a predetermined distance away from the first objective lens 201. For the refractive index of the objective lens 200, in consideration of the thickness and the refractive index of the transparent protective layer 102 on the disk 100, the shapes and refractive indexes of the first and second objective lenses 201 and 202 are adjusted so that the parallel light may be converged onto the information recording face 103 of the disk 100 without causing any aberration.

The first objective lens 201 is an aspherical convex lens having a convex portion formed on the side of the quarter wavelength plate 5. The laser beam B that is parallel light incident upon the first objective lens 201 is refracted at an interface between the surface of the convex portion for the first objective lens 201 and the air to be converted into convergent light, and then refracted again at an interface between the side surface of the disk 100 for the first objective lens 201 and the air to go out of the first objective lens 201.

The second objective lens 202 includes a convex lens 203, two sheets of glass plates 204, 206, and a liquid crystal part 205 that is a refractive index variable member. The convex lens 203 is the lens formed with a convex portion on the side of the first objective lens 201, and a plane orthogonal to the optical axis on the side of the optical disk 100. On the plane of the convex lens 203 on the side of the optical disk 100, the glass plate 204, the liquid crystal part 205 as the refractive index variable member and the glass plate 206 are arranged in this order.

Figure 3:
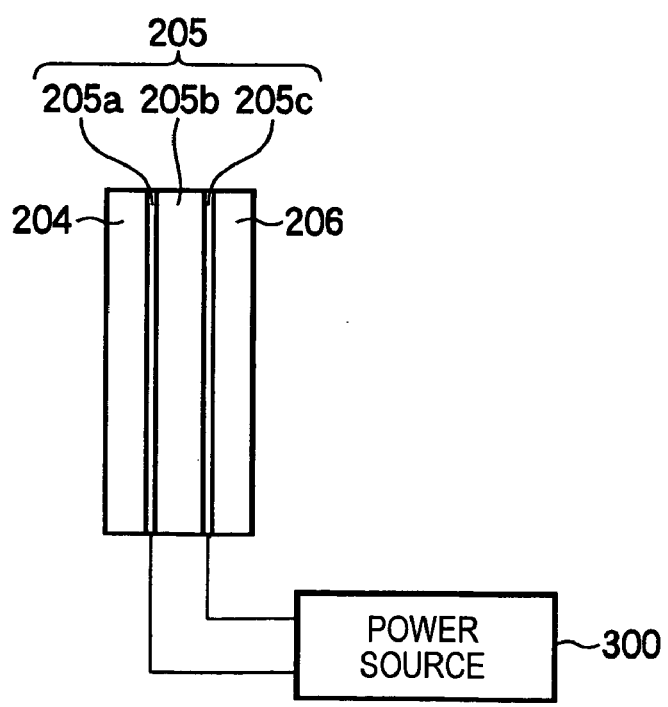
FIG. 3 is a view showing the details of a liquid crystal part.

FIG. 3 is a view showing the details of the liquid crystal part 205 and around it. The liquid crystal part 205 is sandwiched between the glass plates 204 and 206. The liquid crystal part 205 has the electrode films 205*a* and 205*c* having light transmittance formed uniformly on both sides of a liquid crystal plate 205*b*. The electrode films 205*a* and 205*c* are supplied with an electric power from a power source 300 installed outside via a lead wire, so that a voltage is applied to the liquid crystal plate 205*b*. The electrode films 205*a* and 205*c* are formed with films to cover both side faces of the liquid crystal plate 205*b*. The power source 300 applies a single voltage via the electrode films 205*a* and 205*c* to the liquid crystal plate 205*b*.

The liquid crystal part 205 is disposed such that the plane of incidence and the plane of emergence are perpendicular to the optical axis of the objective lens 200. The liquid crystal part 205 has the refractive index varied uniformly in accordance with the magnitude of an applied voltage, if the voltage is applied to the electrode films 205*a* and 205*c*. This liquid crystal part 205 corrects the spherical aberration caused in the laser beam B by a change in the refractive index. The laser beam B transmitted through the liquid crystal part 205 is the convergent light that is converged by the objective lens 201.

When the parallel light is incident upon a medium of plate shape having a different refractive index which is disposed perpendicular to the optical axis, there is no aberration because of no optical path difference (of course, parallel light is not converged). However, when the convergent light converged by the lens is incident upon the medium of plate shape disposed perpendicular to the optical axis, the focal distance is changed in accordance with the distance from the optical axis, resulting in a spherical aberration. For example, the low order spherical aberration amount is represented by the following formula (3).

(Low order spherical aberration amount [$RMS$])=$C(n^2-1)/n^3(d/\lambda)NA^4$      (3)

where n: refractive index of medium d: thickness of medium

λ: wavelength of light incident upon the medium

C: coefficient

In the optical system of the optical pickup device 1, the spherical aberration takes place due to a thickness error of the transparent protective layer formed on the disk surface. The voltage applied to the liquid crystal plate 5 is set such that the liquid crystal plate 5 may have the refractive index to cancel the spherical aberration.

Figure 4:
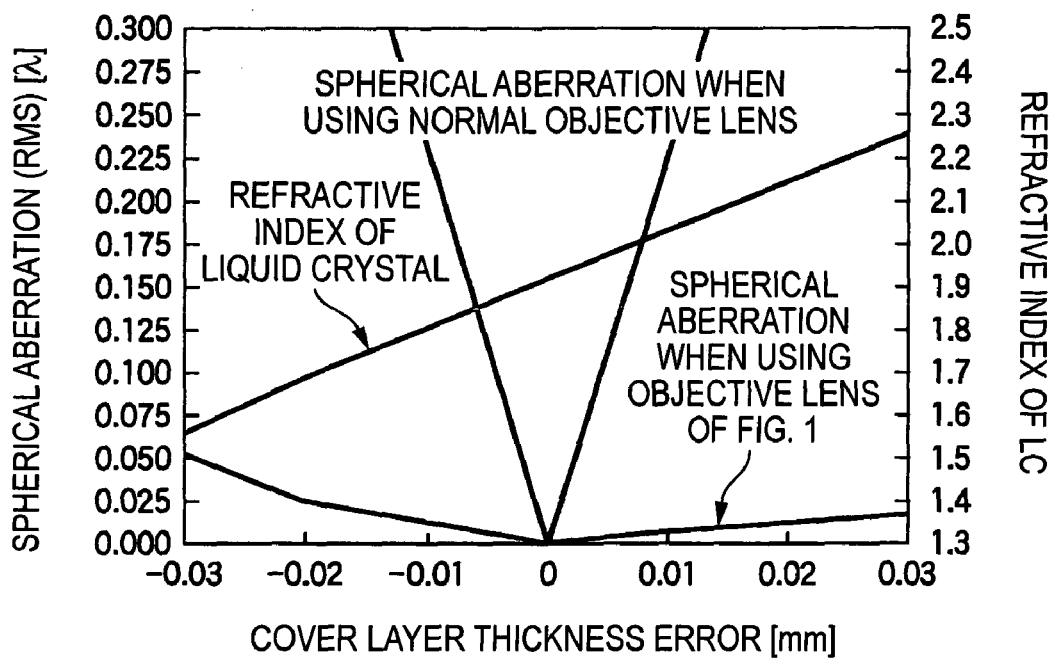
FIG. 4 is a graph showing the relationship between a transparent protective layer and the spherical aberration.

FIG. 4 is a graph showing the results of simulating the relationship between the thickness error of the transparent protective layer 103 in the disk 100 and the spherical aberration, when the spherical aberration is corrected by the liquid crystal plate and when not corrected. Simulation was made employing the objective lens 200 as shown in FIG. 2. The total numerical aperture NA of the objective lens was 0.85 and the wavelength λ of laser beam was 405 (nm). The refractive index of liquid crystal was 1.9 and the thickness of liquid crystal was 0.3 mm when there was no thickness error in the disk 100 in the simulation. In the simulation, a voltage was applied to the liquid crystal plate 205 to change the refractive index of the liquid crystal plate 205 in accordance with the thickness error of the disk 100, as shown in FIG. 4.

As will be seen from FIG. 4, when the thickness error of the transparent protective layer 103 in the disk 100 is zero, there is no spherical aberration. If the thickness error is increased, the spherical aberration is greater in accordance with the thickness error. For example, when the thickness of the transparent protective layer 103 is increased by +0.01 mm from 0, the spherical aberration amount when not corrected is 0.24(λ), whereby it is found that the spherical aberration is as large as about one-fourth of the wavelength. On the other hand, the spherical aberration amount when corrected is about 0.01(λ), and is reduced to about ¹⁄₂₄ as compared with when not corrected. From the above examination, when the correction is made to change the refractive index of liquid crystal by applying the voltage in accordance with the thickness error, the spherical aberration that takes place can be greatly reduced as compared with when not corrected.

As described above, when the spherical aberration takes place depending on the thickness error of the disk 100, or is greatly changed depending on the situation, it is effective that the voltage applied to the liquid crystal plate 205 is changed in real time in accordance with the spherical aberration amount. In this case, the applied voltage may be changed in accordance with the spherical aberration amount by calculating the spherical aberration amount on the basis of a light receiving pattern of the laser beam B received by the light receiving portion 7.

Also, even when the spherical aberration amount has no significant influence in practice, the applied voltage to the liquid crystal plate 205 is changed periodically to make a maintenance for minimizing the spherical aberration amount, whereby the reliability of reproducing the disk is enhanced.

With the optical pickup device according to the first embodiment of the invention, the objective lens 200 has the liquid crystal part 205 having the refractive index changed in accordance with the voltage. Accordingly, the refractive index of the liquid crystal part 205 is changed to minimize the spherical aberration that takes place by appropriately changing the voltage applied to the liquid crystal part 205 in accordance with the spherical aberration amount. Thereby, the reliable optical pickup device can be provided by suppressing an error occurrence of the detection signal.

Also, the liquid crystal part 205 is disposed at a position to transmit the convergent light, it is unnecessary to consider to form a complex electrode pattern or make a number of wirings in the liquid crystal part 205. Particularly, since the electrode pattern of this embodiment is uniform, there is no need that the electrodes 205*a* and 205*c* are aligned with respect to the optical axis.

Also, since the liquid crystal part 205 and the glass plates 204, 206 are simply bonded with the objective lens, the spherical aberration is corrected without increasing the total weight of the objective lens. Also, since there is no need for forming the complex electrode pattern, the manufacturing cost is reduced.

In this embodiment, the liquid crystal part 205 is employed as the refractive index variable member. However, besides, the material that has the refractive index changed by applying the voltage may be used instead of the liquid crystal part 205. For example, instead of the liquid crystal part 205, electro-optical crystal such as $LiNbO_3$ or $KH_2PO_4$ may be directly bonded on the convex lens 203.

Second Embodiment

An optical pickup device according to a second embodiment of the invention will be described below.

Figure 5:
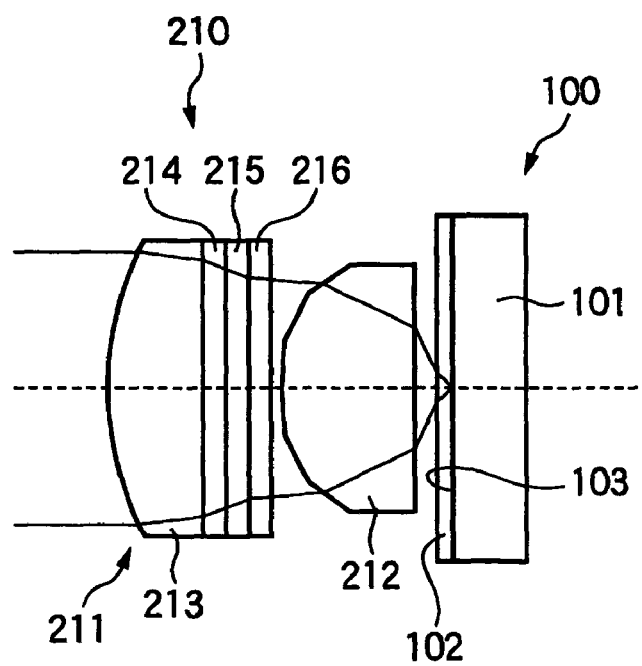
FIG. 5 is a view showing an objective lens according to a second embodiment of the invention.

FIG. 5 is a cross-sectional view showing an objective lens 210 according to the second embodiment of the invention. In the optical pickup device of the second embodiment, the objective lens 200 of the first embodiment is replaced with the objective lens 210.

The objective lens 210 has a first objective lens 211 disposed on the side of the quarter wavelength plate 5 and a second objective lens 212 disposed opposite the disk 100 a predetermined distance away from the first objective lens 211. For the refractive index of the objective lens 210, in consideration of the thickness and the refractive index of the transparent protective layer 102 on the disk 100, the shapes and refractive indexes of the first objective lenses 211 and a second objective lens 212 are adjusted so that the parallel light may be converged onto the information recording face 103 of the disk 100 without causing any aberration.

The first objective lens 211 includes a convex lens 213, two sheets of glass plates 214, 216, and a liquid crystal part 215 that is a refractive index variable member. The convex lens 213 is the lens formed with a convex portion on the side of the quarter wavelength plate 5, and a plane orthogonal to the optical axis on the side of the optical disk 100. On the plane of the convex lens 213 on the side of the optical disk 100, the glass plate 214, the liquid crystal part 215 as the refractive index variable member and the glass plate 216 are arranged in this order. The laser beam B that is parallel light incident upon the first objective lens 211 is refracted at an interface between the surface of the convex portion for the convex lens 213 and the air to be emergent via the glass plate 214, the liquid crystal part 215 and the glass plate 216 on the side of the second objective lens 212.

The second objective lens 212 is an aspherical convex lens having a convex portion formed on the side of the first objective lens. The second objective lens 212 further converges the laser beam B to focus the laser beam B on the information recording face 103 of the optical disk 100.

The liquid crystal part 215 is constituted in the same manner as the liquid crystal part 205 of the first embodiment, and corrects the spherical aberration by applying a voltage between both electrodes in accordance with the spherical aberration.

In the second embodiment as described above, the liquid crystal part 215 is provided on the side of the first objective lens. With this constitution, the convergent light converging on the disk 100 is transmitted through the liquid crystal part 215. Accordingly, the spherical aberration caused by the thickness error of the transparent protective layer 102 in the disk 100 is corrected by applying the voltage between both electrodes in accordance with the spherical aberration in the same manner as in the first embodiment.

Also, since the liquid crystal part 215 and the glass plates 214, 216 are simply bonded with the objective lens, the spherical aberration is corrected without significantly increasing the total weight of the objective lens. Also, since there is no need for forming the complex electrode pattern, the manufacturing cost is reduced.

In this embodiment, the liquid crystal part 215 made from a liquid crystal element is employed as the refractive index variable member. However, besides, the material that has the refractive index changed by applying the voltage may be used instead of the liquid crystal part 215. For example, electro-optical crystal such as $LiNbO_3$ or $KH_2PO_4$ may be employed instead of the liquid crystal part 215.

Third Embodiment

An optical pickup device according to a third embodiment of the invention will be described below.

Figure 6:
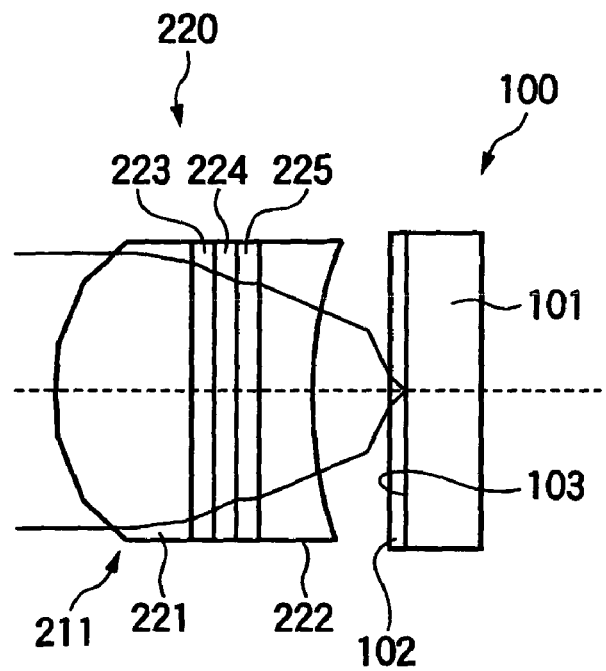
FIG. 6 is a view showing an objective lens according to a third embodiment of the invention.

FIG. 6 is a cross-sectional view showing an objective lens 220 according to the third embodiment of the invention. In the optical pickup device of the third embodiment, the objective lens 200 of the first embodiment is replaced with the objective lens 220.

The objective lens 220 is a single objective lens consisting of a plurality of lenses that are bonded together. For the refractive index of the objective lens 220, in consideration of the thickness and the refractive index of the transparent protective layer 102 on the disk 100, the shape and refractive index of the objective lens 220 are adjusted so that the parallel light maybe converged onto the information recording face 103 of the disk 100 without causing any aberration.

The objective lens 220 includes a convex lens 221, a concave lens 222, two sheets of glass plates 223, 225, and a liquid crystal part 224 that is a refractive index variable member. The convex lens 223 is the lens formed with a convex portion on the side of the quarter wavelength plate 5, and a plane orthogonal to the optical axis on the side of the optical disk 100. On the plane of the convex lens 223 on the side of the optical disk 100, the glass plate 223, the liquid crystal part 224 as the refractive index variable member and the glass plate 225 are arranged in this order. The concave lens 222 is bonded with the glass plate 225 on the side of the disk 100.

The laser beam B that is parallel light incident upon the objective lens 220 is refracted at an interface between the surface of the convex portion for the convex lens 221 and the air to be emergent via the glass plate 223, the liquid crystal part 224, the glass plate 225 and the concave lens 222 on the side of the disk 100. Thereafter, the laser beam B is converged on the information recording face 103 of the optical disk 100.

The liquid crystal part 224 is constituted in the same manner as the liquid crystal part 205 of the first embodiment, and corrects the spherical aberration caused by the thickness error of the transparent protective layer 102 in the disk 100 by applying a voltage between both electrodes in accordance with the spherical aberration.

In the third embodiment as described above, the single objective lens 220 having the liquid crystal part 225 is employed. With this constitution, the convergent light converging on the disk 100 is transmitted through the liquid crystal part 225. Accordingly, the spherical aberration is corrected by applying the voltage between both electrodes in accordance with the spherical aberration in the same manner as in the first embodiment.

Also, since the liquid crystal part 224 and the glass plates 223, 225 are simply bonded with the objective lens, the spherical aberration is corrected without significantly increasing the total weight of the objective lens. Also, since there is no need for forming the complex electrode pattern, the manufacturing cost is reduced. The electrodes maybe bonded on the parallel faces of the lenses 221 and 222 by dispensing with the glass plates 223 and 225.

In this embodiment, the liquid crystal part 224 made from a liquid crystal element is employed as the refractive index variable member. However, besides, the material that has the refractive index changed by applying the voltage may be used instead of the liquid crystal part 224. For example, electro-optical crystal such as $LiNbO_3$ or $KH_2PO_4$ may be employed instead of the liquid crystal part 224.

Fourth Embodiment

An optical pickup device according to a fourth embodiment of the invention will be described below.

Figure 7:
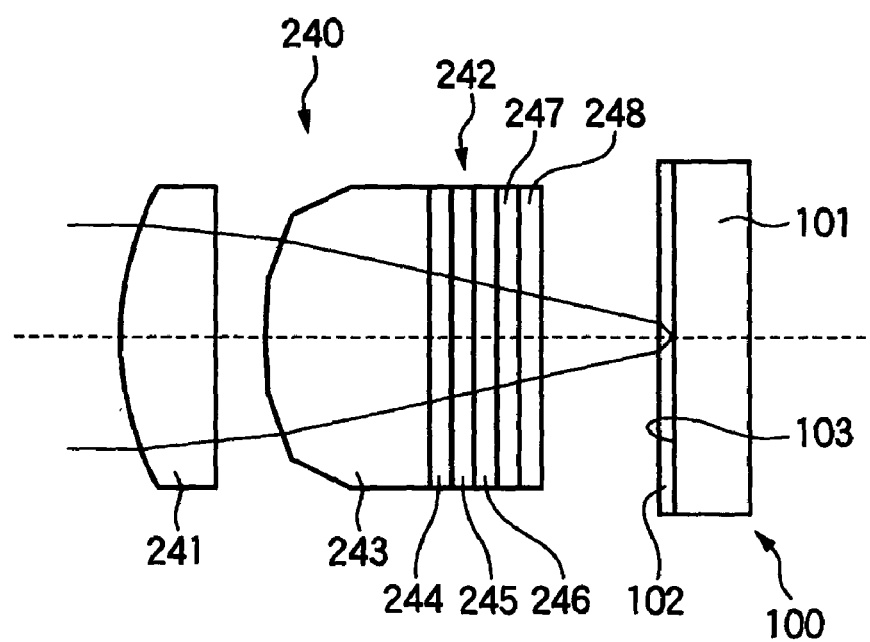
FIG. 7 is a view showing an objective lens according to a fourth embodiment of the invention.

FIG. 7 is a cross-sectional view showing an objective lens 240 according to the fourth embodiment of the invention. In the optical pickup device of the fourth embodiment, the objective lens 200 of the first embodiment is replaced with the objective lens 240. Also, the objective lens 240 has a second liquid crystal part 247 and a glass plate 248 arranged in this order on a glass plate 246 corresponding to the glass plate 206 of the objective lens 200 in the first embodiment on the side of the disk 100. That is, in this embodiment, the laser beam B incident upon the disk 100 is transmitted through the liquid crystal plate twice.

For the refractive index of the objective lens 240, in consideration of the thickness and the refractive index of the transparent protective layer 102 on the disk 100, the shapes and refractive indexes of the first and second objective lenses 241 and 242 are adjusted so that the parallel light may be converged onto the information recording face 103 of the disk 100 without causing any aberration.

In the fourth embodiment as described above, the second liquid crystal part 247 is arranged in addition to the liquid crystal part 245. With this constitution, the convergent light converging on the disk 100 is transmitted through the liquid crystal parts 245 and 247. Accordingly, the spherical aberration for the transmitted laser beam B that is caused by the thickness error of the transparent protective layer 102 in the disk 100 is corrected in the liquid crystal parts 245 and 247.

Also, since the liquid crystal parts 245, 247 and the glass plates 244, 246, 248 are simply bonded with the objective lens, the spherical aberration is corrected without significantly increasing the total weight of the objective lens. Also, since there is no need for forming the complex electrode pattern, the manufacturing cost is reduced.

If the thickness of the liquid crystal plate inserted to correct the spherical aberration is increased, the response time of refractive index change to the applied voltage is longer, whereby there is the possibility that the refractive index change of the liquid crystal plate is not controlled in real time. In such a case, two or more liquid crystal parts are provided as in this embodiment, making the thickness of each liquid crystal plate thinner, and enhancing the responsibility of refractive index change to the voltage so that the refractive index change is controlled in real time.

In this embodiment, the liquid crystal parts 245 and 247 made from the liquid crystal element are employed as the refractive index variable member. However, besides, the material that has the refractive index changed by applying the voltage may be used instead of the liquid crystal parts 245 and 247. For example, electro-optical crystal such as $LiNbO_3$ or $KH_2PO_4$ may be employed.

With the embodiments of this invention, the optical pickup device 1 as the objective lens for converging light onto the information recording medium includes the refracting interface for converting incident light into convergent light, and the refractive index variable member such as liquid crystal or electro-optical crystal disposed between the refracting interface and the information recording medium and having the refractive index changed in accordance with the outside applied voltage. Accordingly, the refractive index is changed by applying the voltage to the refractive index variable member in accordance with the spherical aberration to cancel the spherical aberration.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An objective lens for converging light onto an information recording medium, comprising:
    a first refracting interface for converging an incident light into a convergent light; and
    a refractive index varying member disposed between the first refracting interface and the information recording medium, and having a refractive index that is varied according to an externally applied voltage; and
    a second refracting interface disposed between a refractive index varying member and the information recording medium,
    wherein the objective lens is a single lens.

2. The objective lens according to claim 1, wherein the refractive index varying member has a plate shape.

3. The objective lens according to claim 1, wherein the refractive index varying member has a plane of incidence perpendicular to an optical axis.

4. The objective lens according to claim 1, wherein a single voltage is applied to the refractive index varying member.

5. The objective lens according to claim 1, wherein the refractive index varying member is a liquid crystal.

6. The objective lens according to claim 1, wherein the refractive index varying member is an electro-optical crystal.

7. An optical pickup device comprising:
    a light source for emitting a laser beam;
    an objective lens for converging the laser beam onto an information recording medium; and
    a light receiving portion for receiving the laser beam reflected from the information recording medium,
    wherein the objective lens comprises:
    a first refracting interface for converging the laser beam into a convergent light; and
    a refractive index varying member disposed between the first refracting interface and the information recording medium, and having a refractive index that is varied according to an externally applied voltage; and
    a second refracting interface disposed between a refractive index varying member and the information recording medium,
    wherein the objective lens is a single lens.

8. The optical pickup device according to claim 7, wherein the refractive index varying member has a plate shape.

9. The optical pickup device according to claim 7, wherein the refractive index varying member has a plane of incidence perpendicular to an optical axis.

10. The optical pickup device according to claim 7, wherein a single voltage is applied to the refractive index varying member.

11. The optical pickup device according to claim 7, wherein the refractive index varying member is a liquid crystal.

12. The optical pickup device according to claim 7, wherein the refractive index varying member is an electro-optical crystal.

13. The objective lens according to claim 1, wherein the second refracting interface has a curvature.

14. The optical pickup device according to claim 7, wherein the second refracting interface of the objective lens has a curvature.

* * * * *